United States Patent [19]

Stegemeyer

[11] 3,949,512

[45] Apr. 13, 1976

[54] FISHING DEVICE

[76] Inventor: Kenneth Stegemeyer, 1818 N. 8th St., Sheboygan, Wis. 53081

[22] Filed: Mar. 6, 1975

[21] Appl. No.: 555,753

[52] U.S. Cl. ............................................. 43/43.13
[51] Int. Cl.² ........................................ A01K 91/00
[58] Field of Search .................................. 43/43.13

[56] References Cited
UNITED STATES PATENTS

| | | | |
|---|---|---|---|
| 2,220,302 | 11/1940 | Thorne | 43/43.13 |
| 2,412,399 | 12/1946 | Henricks | 43/43.13 |
| 2,572,427 | 10/1951 | Anglim | 43/43.13 |
| 2,585,494 | 2/1952 | Pelto | 43/43.13 |
| 3,135,065 | 6/1964 | Cromoga | 43/43.13 |
| 3,507,068 | 4/1970 | Roberts | 43/43.13 |

Primary Examiner—Warner H. Camp
Attorney, Agent, or Firm—Fred Philpitt

[57] ABSTRACT

A trolling device for fishing, including; a generally-flat, elongated body member adapted to float in water, having a front end generally-tapering (either flat or rounded) from one side thereof to the other and rearwardly and one side edge thereof heavier than the other; a yoke means mounted on the front end of the body member and extending generally-perpendicularly from that side of the body member having a tapered form, such as a generally-triangular wire-type means with one angle thereof spaced away from that side of the body member having a tapered form and to the rear of the front end of the body member and forming a first engagement point, then slanting inwardly toward the side of the body member and toward the front end of the body member to a second angle thereof adjacent the front end of the body member and forming a second engagement point and, preferably, bent away from the heavier side edge of the body member at an intermediate point of the yoke means; slide means, preferably a ring-type means, mounted on the yoke means, in a manner to normally engage the yoke means at the first engagement point and draw the body member through the water at a predetermined attitude and to slide to the second engagement point and draw the body member through the water at a second predetermined attitude when a jerking motion is applied to one end of the device, and adapted to have a trolling line attached thereto; and fastening means, such as an eyelet means, mounted on the rear end of the body member and adapted to have a tail line attached thereto.

8 Claims, 6 Drawing Figures

FIG. 4
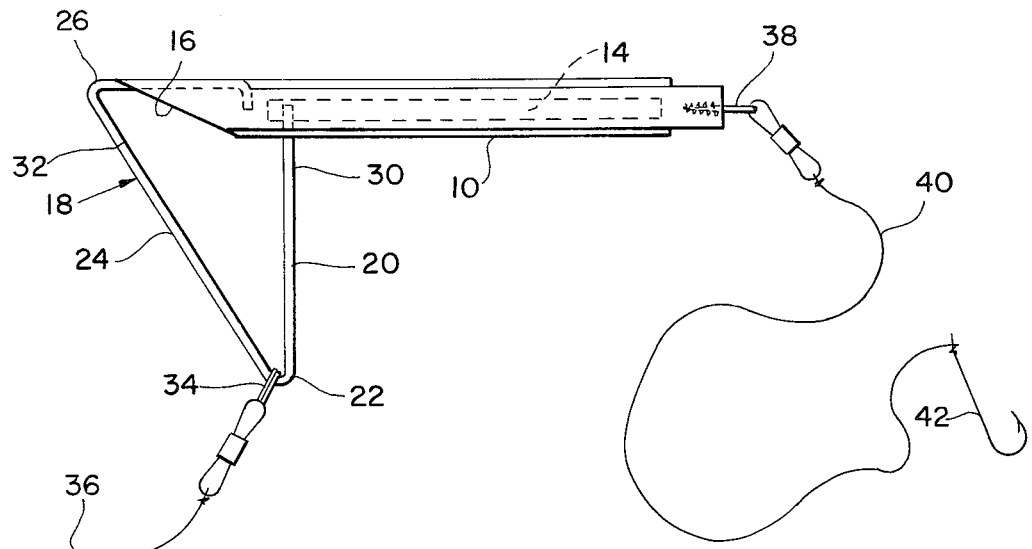
FIG. 5
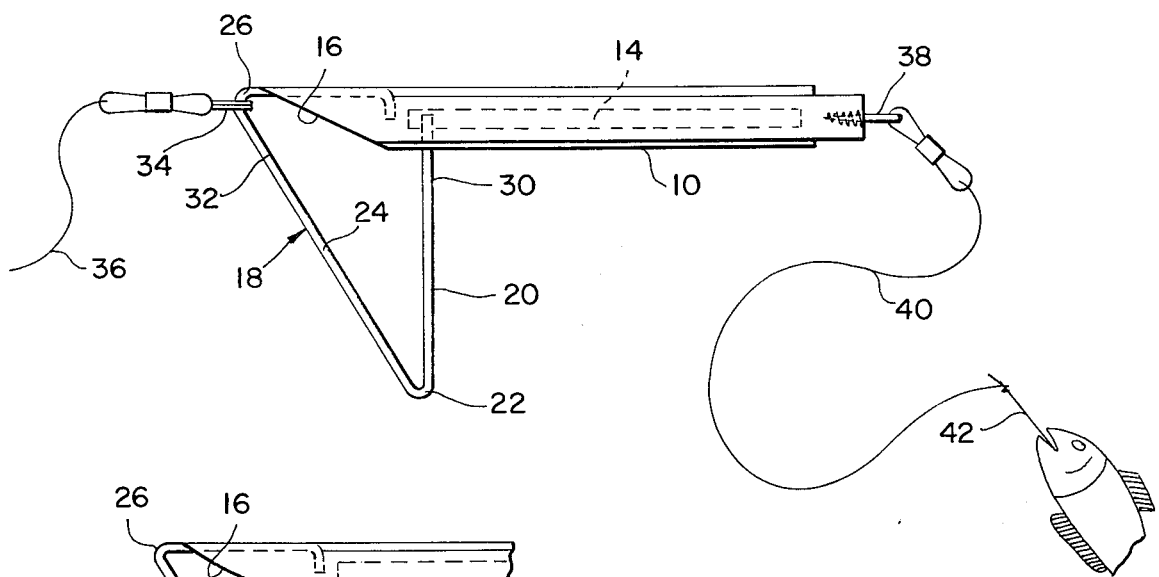
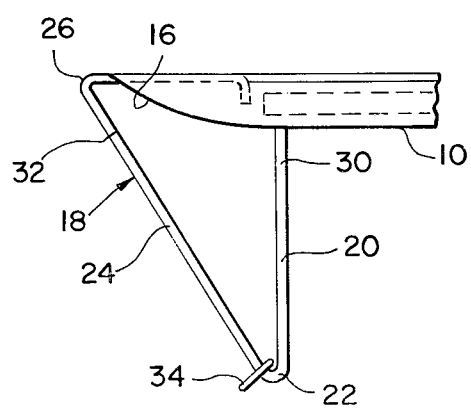
FIG. 6

FISHING DEVICE

BACKGROUND OF THE INVENTION

1. Field of the Invention

The present invention relates to a troll fishing apparatus. In a more specific aspect, the present invention relates to a surface runner for troll fishing which is adapted to travel through the water in a plane perpendicular to the surface of a body of water and offset from the side of the boat.

2. Reference to the Prior Art

As is known to those skilled in the fishing art, when trolling for fish, it is necessary to employ some means adjacent the hook, lure or bait to keep the hook, lure or bait at a proper depth below or adjacent the surface of the water. In the past, the most common means has been the attachment of a weight or sinker on the tail line adjacent the hook, lure or bait.

There are numerous disadvantages to the use of such weights or sinkers. The chief among these, as related to the present invention, is the complete lack of control over the position of the appurtenances of the trolling line with respect to the surface of the water and with respect to the boat. More specifically, as the trolling speed is increased, the trolling line appurtenances (including the sinker) assume positions closer to the surface of the water and as the speed is decreased, they sink deeper. The only way a predetermined depth can be maintained is to change the magnitude of the weight or sinker to compensate for changes in boat speed. This, of course, becomes a troublesome and time-consuming task. Further, the trolling line and its appurtenances necessarily extend in a straight line from the rear of the boat, thus contributing to two disadvantages. First, there is a limit to the number of trolling lines which can be carried by the boat without entanglement. Second, and more importantly, the trolling line and its appurtenances are traveling through water where the fish have already been disturbed and agitated by the passage of the boat over them. As is well known, fish, at times, feed at or very near the surface of the water, thus making them even more susceptable to being frightened by the passage of the boat. In order to overcome the disadvantages of conventional weights and sinkers, numerous patents and commercial devices, known as "diving" or "planing" devices, have been designed. These devices generally have a main body portion structured along the lines of a surfboard or hydroplane and travel through the water in the same manner, namely; with the plane of the body portion parallel to or at an angle with respect to the surface of the water. By the placement and manner of attachment of the trolling line and the tail line, carrying the lure, bait or hook, to the body, these devices are designed to dive to substantial depths in the water and then travel at that level until one tugs on the trolling line or a fish strikes the lure, bait or hook, at which time the body rises toward the surface and usually assumes an attitude in the water at which drag on the line is minimal. The trolling line is usually slidably attached to a hook-type trip and control rod so as to automatically respond to such a tug or strike and change the attitude of the body as indicated above. In some instances, a weight is also slidably mounted on a rod so that it either automatically changes position as trolling speed changes or it can be adjusted to compensate for speed changes. Thus, at least some of the disadvantages of conventional weights or sinkers, with respect to the depth of travel of the trolling line and its appurtenances, have been overcome by these devices. However, the most significant disadvantages, which flow from the position of the trolling line and its appurtenances with respect to the boat, have not been overcome, since these devices travel along a generally straight line path behind the boat.

It is therefore an object of the present invention to provide a trolling device which overcomes the above-mentioned disadvantages of the prior art. Another object of the present invention is to provide a trolling device which travels through the water along a plane offset from the side of the boat, and does so without the aid of side or stabilizing fins. Yet another object of the present invention is to provide a trolling device which permits the boat to carry a substantially larger number of lines. Another and further object of the present invention is to provide a trolling device which will generally reset itself if an accidental tug on the trolling line or wave action on the device accidentally trips the device.

SUMMARY OF THE INVENTION

A trolling device comprising a generally-flat, elongated body member adapted to float in water, having a front end generally-tapering from one side thereof to the other and rearwardly and one side edge thereof heavier than the other to maintain the body means in a generally-vertical position when disposed in the water; yoke means mounted on the front end of the body member and extending generally-perpendicularly from that side of the body member having a tapered form; slide means slidably mounted on the yoke means, in a manner to normally engage the yoke means at a first engagement point and draw the body means through the water at a predetermined attitude and to slide to a second engagement point and draw the body means through the water at a second predetermined attitude when a jerking motion is applied to one end of the device and adapted to have a trolling line attached thereto; and fastening means mounted on the rear end of the body member, and adapted to have a tail line attached thereto. The yoke means is preferably bent away from the heavier side edge of the body member at an intermediate point of the yoke means.

BRIEF DESCRIPTION OF THE DRAWINGS

FIG. 4 is a top view of the device of FIG. 1, with the trolling line in the trolling or untripped position;

FIG. 5 is a top view of the device of FIG. 1 with the trolling line in the tripped position; and FIG. 6 is a top view of a partial section of the device of FIG. 1 having a modified front end configuration.

DESCRIPTION OF THE PREFERRED EMBODIMENTS

Figure 1:
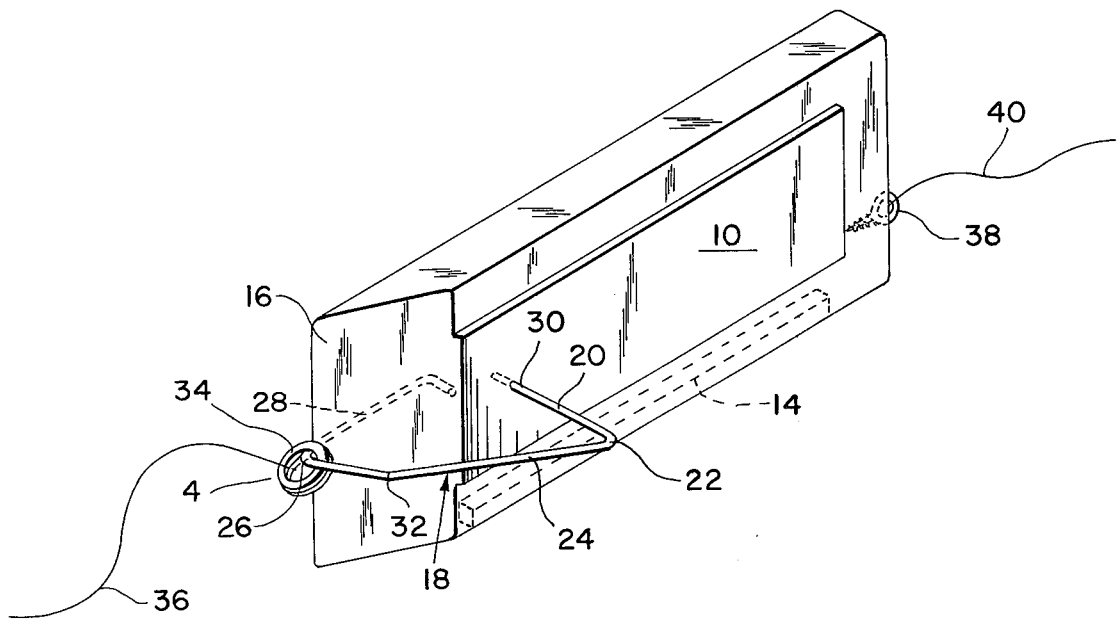
FIG. 1 is a perspective view of the trolling device of the present invention.
Figure 2:
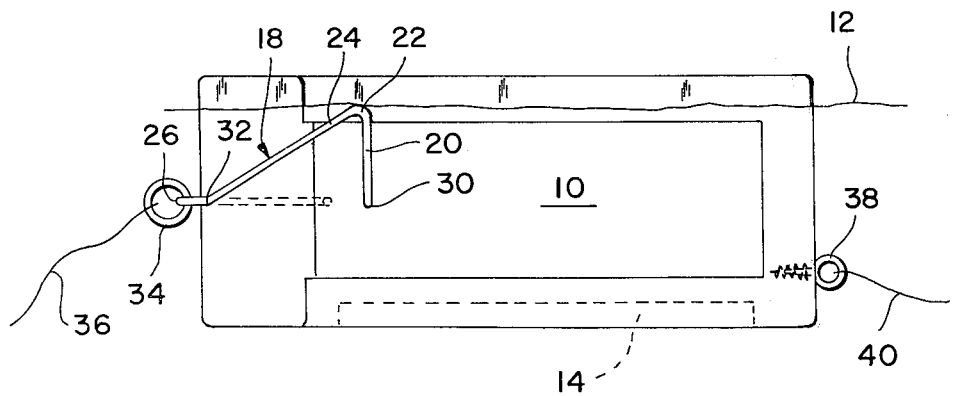
FIG. 2 is a side view of the device of FIG. 1.
Figure 3:
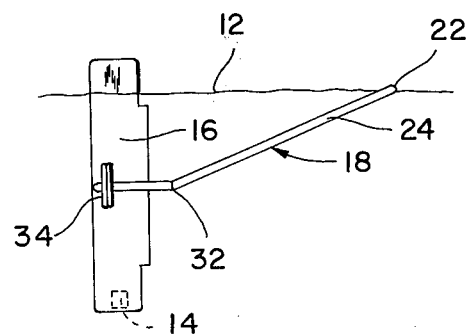
FIG. 3 is an end view of the front end of the device of FIG. 1.

In accordance with the drawings, the numeral 10 designates the main body portion of the device. It should be noted here and kept in mind throughout the remaining discussion that the body 10 is to travel through the water perpendicular to the surface of the water, as indicated by water line 12 in FIGS. 2 and 3.

Body 10 is constructed of a suitable wood or hollow or foam plastic to provide both suitable buoyancy and suitable depth or thickness for stability. Mounted in the lower edge of body 10 is a weight 14. Weight 14 is inlaid in the body 10 and serves to maintain the body 10 in its vertical position in the water and also governs to some extent the depth of the device in the water. Weight 14 can be removable and replaceable to change the amount of weight or may be designed in a manner such that additional weights may be readily added and removed. The front portion 16 of body 10 is angled, as shown in FIGS. 1 through 5, or rounded, as shown in FIG. 6. In any event, front portion 16 slopes rearwardly and inwardly from the side of body 10 most remote from the trolling boat. This configuration of portion 16 serves to propel the device out and away from the side of the boat. Body 10 may be colored in various hues to attract different fish under varying conditions.

Mounted on the forward portion and approximately at a midpoint between the upper and lower edges of body 10 is generally-triangular bridle, yoke or trip and control rod 18. Trip and control rod 18 is embedded in body 10 at a point spaced from the front edge of body 10 and a portion 20 extends outwardly and generally-perpendicular to body 10. Rod 18 is then bent downwardly to form an attachment point, knee or loop 22 and extends forwardly to a point beyond the front edge of body 10 to form an angular portion 24 having an angle of about 45° with respect to the plane of body 10. Rod 18 is then bent rearwardly to form a second attachment point, knee or loop 26 and a third portion 28 parallel to the body 10, a portion of which is embedded in body 10. The angle of portion 24 of rod 18 is such that it offsets the pull of the trolling line against the device, it carries the device at the proper angle or attitude while traveling through the water and it makes the device capable of tripping when a fish strikes the lure, bait or hook carried by the tail line, as hereinafter described. Portions 20 and 24 of rod 18 are also bent upwardly at points 30 and 32, respectively. This upward bend is designed to keep the device traveling vertically in the water and at the desired angle, it aids in determining the depth of the device in the water and it aids in resisting accidental tripping of the device and/or automatic resetting of the device when accidentally tripped.

Slidably mounted of rod 18 is trip and control ring 34, and trolling line 36, which leads to the boat, is attached thereto.

Mounted in the rear edge of body 10 is eyelet or tail line attaching means 38. Attached to eyelet 38 is tail line 40 which carries appropriate appurtenances, such as hook 42, a lure or bait, etc. Eyelet 38 is mounted adjacent the bottom edge of body 10 but may be located at other points along the rear edge, depending upon the desired depth of the tail line 40 and its appurtenances. More than one eyelet may be mounted on the rear edge of body 10 or eyelet 38 may be slidably and adjustably mounted in said edge to permit adjustment of the position of tail line 40.

In operation, the ring 34 will be positioned on rod 18 at the knee 22, as illustrated in FIGS. 4 and 6. This represents the trolling or untripped condition of the device. As previously indicated, the device will travel through the water with the body 10 vertically disposed, with respect to the surface of the water, it will be positioned outwardly from the side of the boat and, preferably, to the rear of the boat and at a predetermined depth in the water near the surface (rather than substantially below the surface, as in the prior art devices). It should be noted at this point, that once the depth of the device in the water is set, by the design and/or adjustment thereof, such depth will remain substantially unchanged by changes in the trolling speed. Instead, such changes in trolling speed will simply change the position of the device relative to the side of the boat (move it toward or away from the side of the boat). When a fish strikes the lure, bait or hook on tail line 40, the device will automatically trip by sliding ring 34 forwardly on portion 24 of rod 18 to knee 26, as shown in FIGS. 1 through 3 and 5. This tripping of the device will serve to set the hook in the fish and change the angle or attitude of body 10 so that it moves through the water with less resistance. The latter, of course, allows the fisherman to make a more sporting retrieval of the fish.

The device as shown in the drawings is designed to traval parellel to the right side of the boat. A device for traveling parallel to the left side of the boat is made by simply positioning weight 14 on the opposite edge of body 10 and bending rod 18 away from the weight (toward the edge not carrying the weight, which is now the top edge) at points 30 and 32. Eyelet 38 should also be positioned adjacent the edge carrying the weight.

The rod 18, eyelet 38 and weight 14 are preferably made of a non-corrosive metal.

The device of the present invention is equally adaptable to both fresh water and salt water fishing, by selection of proper materials of the type suggested herein.

While specific structures and modifications of the invention have been illustrated and described herein, it is to be recognized that other modifications and variations thereof will be apparent to one skilled in the art. Accordingly, the present invention is to be limited only in accordance with the appended claims.

What is claimed is:

1. A trolling device, comprising; a generally flat, elongated body means adapted to float in water, having a front edge generally tapering rearwardly and from one surface plane of said body to the other and a bottom edge heavier than the top edge to maintain said body in a generally vertical position when disposed in said water; yoke means mounted on said body adjacent said front edge thereof having a generally-triangular configuration, said triangle having a first side extending outwardly from said plane of said body having said tapered form and rearwardly therefrom, a second side extending from the rearward end of said first side downwardly toward said body and generally perpendicular to said plane of said body having said tapered form to form a first angle between said first side and said plane of said body having said tapered form and a second angle between said first and second sides of said triangle, and bent upwardly toward said top edge of said body at intermediate points along said first and second sides of said triangle; and slide means slidably mounted on said yoke to normally engage said yoke at said second angle and draw said body through said water at a first predetermined attitude and to slide to and engage said yoke at said first angle and draw said body through said water at a second predetermined attitude when a pulling force is exerted on the rear edge of said body.

2. A device in accordance with claim 1 wherein the tapered front end is generally flat.

3. A device in accordance with claim 1 wherein the tapered front end is generally arcuate.

4. A device in accordance with claim 1 wherein the heavier side edge is formed by mounting a weight in said edge.

5. A device in accordance with claim 1 wherein the yoke means is a rod-type means and the slide means is a ring means slidably mounted on said rod-type means.

6. A device in accordance with claim 1 wherein the first side of the triangle is bent outwardly away from the plane of the body having the tapered form at an intermediate point along the length of said first side of said triangle to form a third angle.

7. A device in accordance with claim 1 wherein a fastening means is mounted adjacent the rear edge of the body and is adapted to have a tail line attached thereto.

8. A device in accordance with claim 7 wherein the fastening means has an eyelet form.

* * * * *